Aug. 18, 1925.  
W. H. NEELY  
UNDERSLUNG TIRE CARRIER  
Filed Oct. 5, 1923

1,550,447

INVENTOR.  
WILLIAM H. NEEL  
BY  
ATTORNEYS.

Patented Aug. 18, 1925.

1,550,447

UNITED STATES PATENT OFFICE.

WILLIAM H. NEELY, OF DETROIT, MICHIGAN, ASSIGNOR TO GRAHAM BROTHERS, OF EVANSVILLE, INDIANA, A CORPORATION.

UNDERSLUNG TIRE CARRIER.

Application filed October 5, 1923. Serial No. 666,751.

*To all whom it may concern:*

Be it known that I, WILLIAM H. NEELY, a citizen of the United States, and a resident of Detroit, county of Wayne, and State of Michigan, have invented a certain new and useful Underslung Tire Carrier; and I do hereby declare that the following is a full, clear, and exact description thereof, reference being had to the accompanying drawings, in which like numerals refer to like parts.

This invention relates to an underslung platform tire carrier adapted particularly for use in carrying spare tires on motor trucks. This type of tire carrier is principally adapted for use on trucks having rearwardly extending overhanging bodies, permitting of sufficient space thereunder in the rear of the wheels for carrying the spare tire.

The object of this invention is to provide an underslung platform or tire rack of convenient arrangement which will be of light but sturdy construction, adapted for supporting a spare tire in an accessible position.

Another feature of the invention resides in the arrangement of the locating ring for causing the tire to be properly positioned upon the carrier and the clamping means for rigidly securing it in position thereon so as to eliminate vibration and rattle and prevent its being lost on the road.

The full nature of the invention will be understood from the accompanying drawings and the following description and claim.

Figure 1:
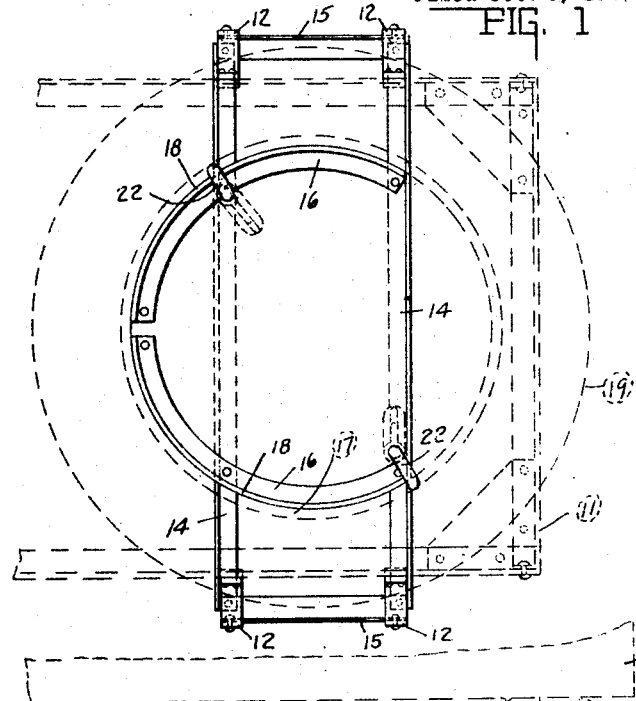
Figure 4:
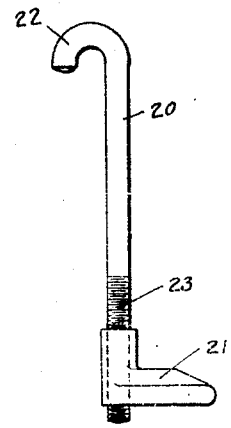
Figure 2:
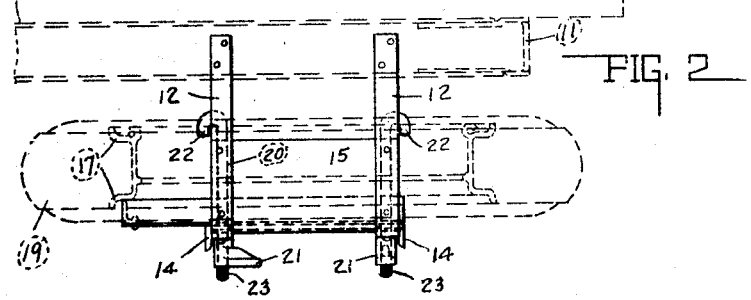
Figure 3:
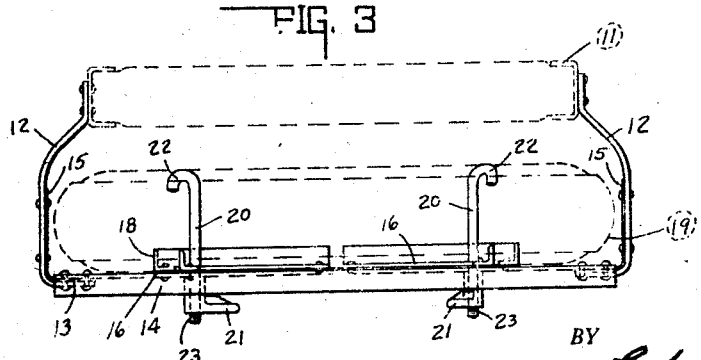

In the drawings, Fig. 1 is a plan view looking down on the tire carrier showing a tire in clamping position thereon. Fig. 2 is a side elevation of a tire carrier. Fig. 3 is a rear elevation thereof. Fig. 4 is a side elevation of the clamping bolt and wing nut.

In the drawings there is shown the rear end of a truck-bed 10 mounted upon the usual frame 11 forming a part of the chassis of the truck. It will be noted that in this type of truck, the truck body or bed 10 extends rearwardly a substantial distance from the rear axle and wheels. This permits of a convenient place for supporting a spare tire on an underslung or suspended tire rack, as will be hereinafter described.

The tire rack comprises a pair of metal straps or stirrups 12 riveted to each side of the frame 11, shown in Fig. 3. The straps 12 are curved outwardly and extend downwardly so as to give sufficient clearance for the maximum diameter of the tire to be carried. At the lower end of the straps 12, there is provided an inwardly extending stirrup portion 13 to which the platform irons 14 are riveted. The platform irons extend from a stirrup portion of one strap 12 to the stirrup portion of the strap mounted on the opposite side of the frame, thereby extending directly across the body of the truck from one side to the other, and spaced from the bed 10 sufficiently to permit the free manipulation of the tire to be carried thereby. As there is provided a pair of straps on each side of the frame spaced apart a distance of substantially one-third of the diameter of the tire, there will likewise be two supporting platform irons 14 spaced apart the same distance and extending parallel with each other. Each pair of straps 12 are connected and held rigid in position so as to be well braced, by the metal plates 15, as shown in Figs. 1 and 3.

Rigidly mounted upon the platform bars 14, there are sectional locating rings 16, said rings having the same curvature as the tire to be carried and so arranged as to fit against the inner periphery of the tire rim 17 when peripherally and centrally positioned upon the platform bars, as shown in Fig. 1. As shown herein, there are two sectional rings 16 each of which has one end rigidly secured to the forward platform bar 14 and the other end extending beyond the rear platform bar 14, thereby completing substantially two-thirds of a circle, and having its center midway between the two platform bars and side frame bars 11. The free ends of the sectional locating rings are slightly spaced apart, as shown in Fig. 1, and are held securely in fixed position by reason of the riveting of said sectional rings to the platform bars 14. As shown in Fig. 2, the tire rim 17 is positioned upon and supported directly by the upwardly extending flanges 18 of the sectional locating rings 17 so as to withhold the sides of the tire from the platform bars 14, thereby preventing any wear thereof.

The tire 19 which is mounted upon the tire rim 17 is firmly held in its supported position by means of the clamping hooks 20 and the wing nuts 21. The clamping hooks 20 are provided with a hook portion 22 which engages over the upper edge of the tire rim 17, and a shank portion which extends through a suitable hole provided in the platform bars 14. The lower end of the hook 20 is threaded at 23, which portion extends below the platform bars to receive the wing nut 21 for drawing the hook portion 22 down against the rim 17 in clamping position.

By reason of the construction of the supporting platform suspending the tire beneath the body of the truck from the rear extension of the frame, the sectional locating rings and the clamping hooks, it will be observed that the tire may be readily removed by loosening the clamping hooks so as to turn them away from engagement with the rim and lifting the tire slightly upwardly so that it will clear the locating ring. When it is placed in position thereon and clamped firmly, the tire proper will be free from engagement or contact with any part of the carrier, while at the same time it will be held firmly and securely in position.

The invention claimed is:

The combination with a vehicle frame, of a tire carrier suspended therefrom and positioned directly beneath the same, comprising supporting straps secured to each side of the frame and extending downwardly therefrom, a pair of horizontally extending parallel bars spaced from each other and forming a supporting platform carried by said straps, said bars being spaced from the under side of said frame, a horizontally extending sectional locating ring mounted on said bars and rigidly secured thereto, an annular and upwardly extending flange portion provided on said ring arranged to engage and support the tire rim at a sufficient elevation from said bars to prevent the engagement of any part of said ring by the tire mounted on said rim, and a plurality of clamping hooks extending vertically through said bars for hooking over the tire rim and removably clamping said rim in position on said locating ring, substantially as shown and described.

In witness whereof, I have hereunto affixed my signature.

WILLIAM H. NEELY.